United States Patent [19]
Zaborszki et al.

[11] Patent Number: 5,638,869
[45] Date of Patent: Jun. 17, 1997

[54] FLEXIBLE METAL HOSE CONNECTOR AND METHOD OF FORMING SAME

[75] Inventors: Stephen J. Zaborszki, Bedford; Gregory Kreczko, Hudson, both of Ohio

[73] Assignee: Swagelok Quick-Connect Co., Hudson, Ohio

[21] Appl. No.: 639,266

[22] Filed: Apr. 24, 1996

Related U.S. Application Data

[60] Division of Ser. No. 386,527, Feb. 10, 1995, Pat. No. 5,511,720, which is a continuation-in-part of Ser. No. 348,722, Dec. 1, 1994, Pat. No. 5,499,439, which is a continuation-in-part of Ser. No. 897,441, Jun. 2, 1992, Pat. No. 5,404,632.

[51] Int. Cl.$^6$ .................................................. F16L 55/00
[52] U.S. Cl. ..................... 138/109; 138/121; 285/286; 228/136
[58] Field of Search ........................ 138/109, 122, 138/121; 285/149, 286; 29/508, 515, 516, 890.144; 228/136

[56] References Cited

U.S. PATENT DOCUMENTS

| | | | |
|---|---|---|---|
| 4,089,351 | 5/1978 | Ward et al. | 138/109 |
| 4,204,707 | 5/1980 | Lincicome et al. | 138/121 X |
| 4,227,639 | 10/1980 | Blumenberg | 285/286 X |
| 4,544,187 | 10/1985 | Smith | 285/256 |
| 4,887,853 | 12/1989 | Flowers et al. | 285/287 |
| 5,069,253 | 12/1991 | Hadley | 138/109 |
| 5,172,477 | 12/1992 | Hadley | 29/890.144 |
| 5,297,586 | 3/1994 | McIntosh | 138/109 |

*Primary Examiner*—Patrick Brinson
*Attorney, Agent, or Firm*—Fay, Sharpe, Beall, Fagan, Minnich & McKee

[57] ABSTRACT

An end fitting is secured to a flexible metal hose comprised of a corrugated tube enclosed in a tubular braid in a manner that provides a single weld operation. An end of the hose is cut to bring the tube and braid ends into alignment. Thereafter, an end fitting is moved over the hose end and radially swaged into gripping engagement with the hose. A circumferential deep penetration weld integrally secures all the components, namely, the tube, the braid, and the fitting.

5 Claims, 10 Drawing Sheets

FLEXIBLE METAL HOSE CONNECTOR AND METHOD OF FORMING SAME

BACKGROUND OF THE INVENTION

This is a divisional of application Ser. No. 08/386,527, filed Feb. 10, 1995, now U.S. Pat. No. 5,511,720, which is a continuation-in-part of U.S. Ser. No. 08/348,722, filed Dec. 1, 1994, for "Flexible Metal Hose Connector and Method of Forming Same" now U.S. Pat. No. 5,499,439, which is a continuation-in-part of U.S. application Ser. No. 07/897,441, filed Jun. 2, 1992, and now U.S. Pat. No. 5,404,632.

This invention relates to the art of flexible metal hose and more particularly to a method of preparing a flexible metal hose and securing a connector or fitting thereto, as well as the assembly obtained thereby. The invention is particularly applicable to flexible metal hose that is comprised of an inner corrugated tube which is covered by a sheath of braided metal wire. Any one of a number of fluid fittings may be secured to ends of the flexible metal hose, and it is envisioned that opposite ends of the flexible metal hose may even incorporate different types of fittings. The assembly finds application in installing flexible loops that allow for thermal expansion, misalignment, intermittent flexing, or continuous flexure, for example as may be caused by vibration. Of course, and as will be readily understood, it may also be used for static bend arrangements. These uses and the environment are merely exemplary, and it will be appreciated that the invention may be advantageously employed in still other environments and applications.

A conventional, prior art method of assembling a flexible metal hose connector incorporates two separate welding operations. As used herein the term "welding" is to be accorded its broadest interpretation and encompasses various types of welding as well as the concepts of brazing and soldering. An alternate expression for welding is fusion bonding and these terms will generally be used synonymously.

According to one prior art method of assembling flexible metal hose, the corrugated tube and the braided sheath are terminated at a desired location. A sleeve is then advanced over the metal braid and aligned with the terminal ends of the tube and braid. A first weld, known as a cap weld, joins the sleeve, braid, and tube together. Thereafter, a fitting is advanced into abutting engagement with the first weld area, and a second weld, particularly a fillet weld, joins the external periphery of the fitting to the terminal end of the metal hose, i.e., the welded sleeve, braid, and tube.

Although this method of assembly has been used with a tremendous amount of commercial success, a primary drawback is that it relies on the skill of the individual welder. Variations may occur from one metal hose connector to another, whether assembled by the same or different welders. For example, the welder secures the tube, braid, and sleeve together in the first weld step. These three components may not be concentrically secured together, or one of the components may not be effectively secured to the other two components. The welder must also provide a generally planar surface to adapt the intermediate assembly to receipt of the fitting. Again, such steps are labor intensive and subject to variation from one completed flexible metal hose connector to another.

A number of other methods have been proposed in prior art patents. These include U.S. Pat. No. 2,172,532—Fentress; U.S. Pat. No. 2,473,879—Guarnaschelli; U.S. Pat. No. 4,527,819—Desilets, et al.; U.S. Pat. No. 3,740,832—Toepper; U.S. Pat. No. 2,028,600—Guarnaschelli; U.S. Pat. No. 2,444,988—Guarnaschelli; and U.S. Pat. No. 2,300,547—Guarnaschelli. The subject invention, though, is believed to offer a number of advantages over these prior art arrangements.

SUMMARY OF THE INVENTION

The present invention contemplates a new and improved apparatus and method that overcomes various deficiencies in the prior art, and simplifies the process of securing a fitting to a flexible metal hose.

According to the invention, a flexible metal hose comprises an inner tube, a braid received over the tube, and a sleeve received over the braid. A fitting is secured thereto by locating the sleeve relative to the end of the tube. The sleeve is thereafter deformed to mechanically interlock the sleeve, braid, and tube together. The tube is then axially deformed, a fitting located on the deformed surface, and the fitting thereafter welded to the sleeve, braid, and tube.

According to another aspect of the invention, the braid end is spread radially outward after the sleeve deforming step.

According to yet another aspect oft he invention, the radially spread braid end is cut at its interface with the sleeve.

According to a still further aspect of the invention, the fitting is provided with a radially enlarged axially extending shoulder that becomes the consumable material during the welding step.

According to a further form of the invention, a flexible metal hose comprising a corrugated inner tube and an outer braid is joined to a fitting that has a cylindrical body with an axial bore that has an inlet end that receives an end of the hose and allows it to be located against an internal shoulder. The wall of the cylindrical body is of reduced thickness about the end of the hose and adjacent the shoulder. After performance of a radial inward swaging operation to cause the body to grip the hose, a deep penetration weld is made through the reduced thickness wall section to weld the end of the hose to the fitting and seal between the fitting and the hose.

Preferably, the swaging operation is performed to deform the fitting body inwardly in a circumferential band that extends from the area of the weld a substantial distance toward the inlet end of the bore to cause the fitting to mechanically grip the hose in the fitting sleeve to substantially reduce the transmission of bending forces from the hose to the weld. By reducing these forces, the possibility of weld failure is greatly reduced.

In accordance with a further aspect of the invention, the reduced thickness of the wall is the result of a circumferential groove that is formed about the exterior of the cylindrical body of the fitting. The weld is made in the bottom of the groove to thereby confine the weld puddle to provide improved weld appearance, as well as improved strength and integrity.

In one form of the invention, the groove is axially spaced from the fitting bore shoulder. This assures that the weld is carried out of a location wherein both the corrugated tube and braid are located. Further, by spacing the weld axially from the shoulder, the need for end preparation on the hose is reduced or eliminated and a simple cutting operation is sufficient to prepare the hose end.

A principal advantage of the invention is the ability to perform a single weld to secure a fitting to a flexible metal hose, i.e., the tube, braid, and fitting are joined together in the single weld.

A further object and advantage is to provide a weld connected end fitting on a flexible hose wherein the weld area is protected from bending forces by a mechanical connection located between the weld and the exposed portion of the hose.

Yet another advantage of the invention results from the increased number of hose connectors that may be completed per hour.

Still another advantage resides in the better quality of the hose assembly, e.g., better concentricity, straightness, and overall aesthetics.

Still another advantage is found in the consistency of the completed hose assemblies and increased performance.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment and method of which will be described in detail in the specification and illustrated in the accompanying drawings which form a part hereof, and wherein.

DETAILED DESCRIPTION OF THE PREFERRED AND ALTERNATE EMBODIMENTS AND METHODS

Figure 1:
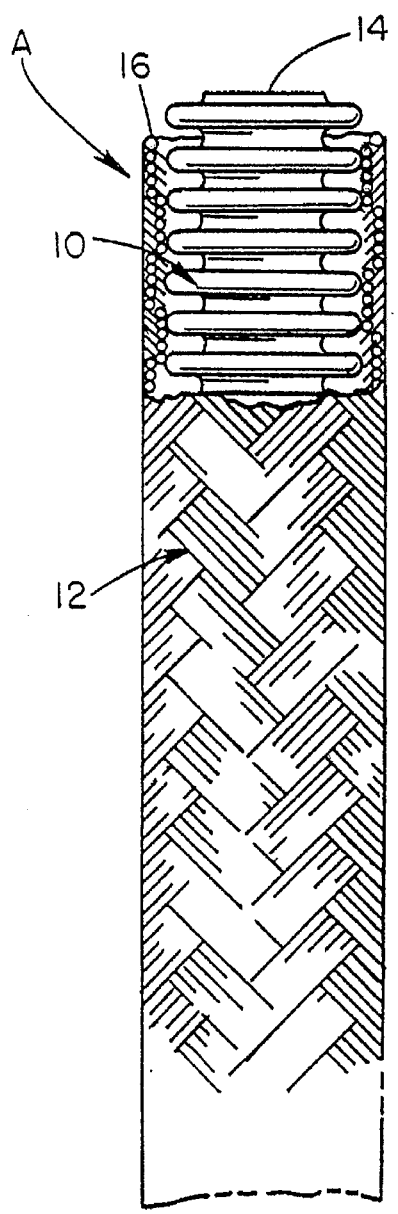
FIG. 1 is an elevational view partly in cross section of two primary components of a flexible metal hose.

Referring now to the drawings wherein the showings are for purposes of illustrating the preferred embodiment and method of the invention only and not for purposes of limiting same, the FIGURES show a flexible metal hose A to which is secured a fitting B in a preferred manner and according to a preferred method of assembly.

Figure 2:
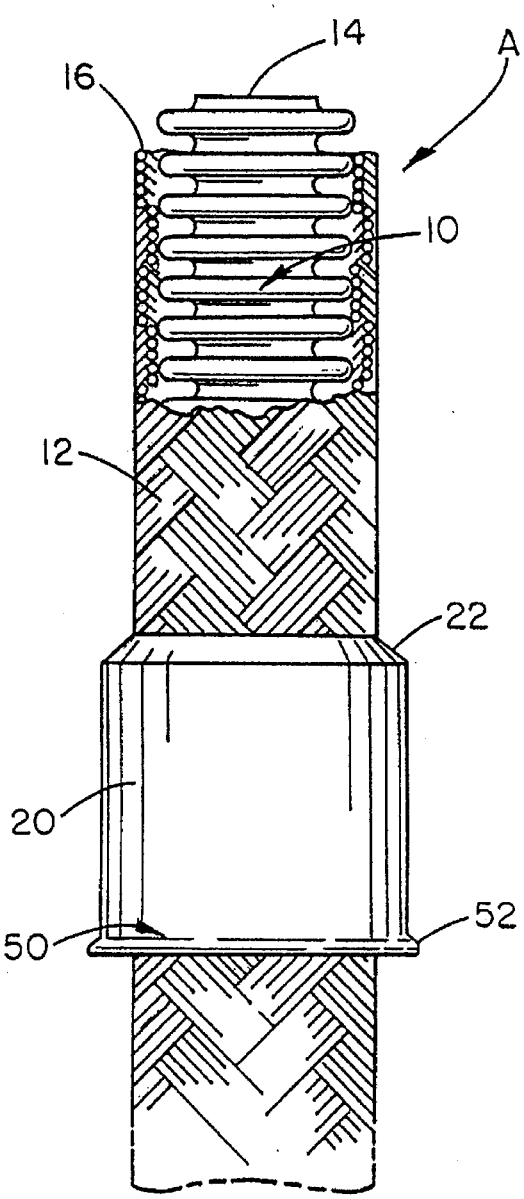
FIG. 2 is similar to FIG. 1 and in which a third component is advanced over the hose.

More particularly, and with reference to FIGS. 1 and 2, the flexible metal hose A comprises an inner corrugated tube 10 and a surrounding sheath or metal braid 12. As shown, the corrugated tubing is defined by a series of concentric corrugations, although it will be understood that in other applications helical corrugations may be used with equal success. Generally, the corrugations are equally spaced apart in the longitudinal direction whether helical or concentric corrugations are used. Further, according to a preferred arrangement, the hose is a type 316 stainless steel, while the braid is a type 321 stainless steel. As will be readily understood by one skilled in the art, these materials are exemplary only since still other materials may be suitable for different purposes.

Ends 14, 16 of the tube and braid, respectively, are terminated in any well known manner. As shown in FIGS. 1 and 2, the ends 14, 16 are longitudinally or axially aligned, but as will become apparent below, the tube and braid can initially be moved axially relative to one another.

A sleeve 20 is placed over the tube and braid (FIG. 2), and has an interior diametrical dimension slightly greater than the braid to permit it to be moved axially relative thereto. The sleeve is preferably a hollow cylindrical member having a chamfered end 22 that is positioned to face the terminal ends 14, 16 of the tube and braid for reasons which will become more apparent below. Again, and although other materials can be used for different purposes, in the preferred arrangement the sleeve is a 316 stainless steel.

Figure 3:
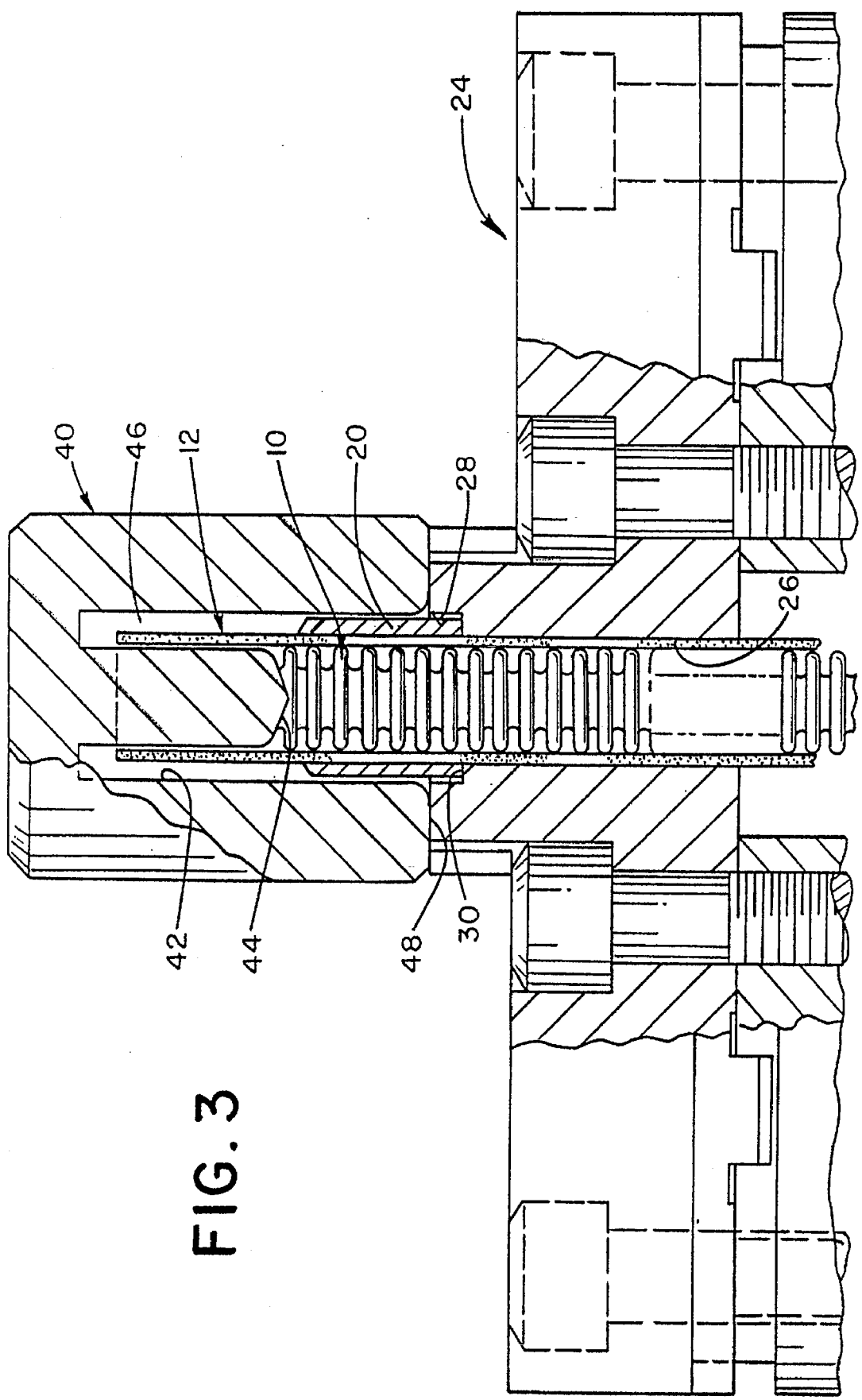
FIG. 3 is a cross-sectional view of the flexible metal hose of FIG. 2 disposed in a gauge for locating the components of the flexible metal hose.

The assembly of FIG. 2 is located in a work support 24 such as a set of cooperating chuck jaws (FIG. 3). The end of the metal hose to receive the fitting extends outwardly from a through opening 26 in the work support. At an axial outer end of the through opening, a counterbore 28 defines a radial shoulder 30. As illustrated, the counterbore is dimensioned to closely receive the sleeve and support the sleeve on shoulder 30, and the chamfered end 22 extends outwardly a preselected dimension from the work support.

A gauge 40 is positioned over the axially outer ends of the hose assembly components, i.e., the tube, braid, and sleeve. More particularly,, the gauge includes a closed end cylindrical recess 42 diametrically dimensioned for receipt over the sleeve. An axially extending locating nose 44 protrudes into the recess toward the open end thereof defining an annular cavity 46. The nose has a diametrical dimension approximately equal to the diameter of the corrugated tube 10 so that the tube cannot extend into cavity 46. As shown in FIG. 3, the diameter of the nose is also less than the braid thereby permitting the braid to extend therepast.

An inner end 48 of the gauge abuts against the work support 24. The terminal end of the flexible hose is thus received in the gauge in a manner so that the nose 44 abuts against tube end 14. The braid 12 is permitted to extend into the annular cavity, while the sleeve 20 essentially remains unaffected by the gauge, being supported by shoulder 30 of the work support. Advancement of the gauge and relative positioning of the components of the flexible metal hose axially locate the chamfered end 22 of the sleeve relative to the tube end 14. This is the critical relationship defined by the gauge as will become apparent below. The extent of receipt of the braid 12 in the annular cavity is not as critical. As long as the braid end extends past the chamfered end of the sleeve and the end of the tube, further positioning thereof is unnecessary.

The end 50 of the sleeve opposite the chamfered end 22 may also be modified to include a slight protrusion or shoulder 52 that assists in holding the sleeve in place during the locating step described above. This modification is illustrated in FIG. 2 but not in the remaining views. It will be understood that the shoulder is preferably circumferentially continuous if incorporated into the assembly. Similarly, suitable modification to the internal configuration of the work support surrounding the lower end of the sleeve will be required to accommodate the shoulder and accurately hold the sleeve in position.

Figure 4:
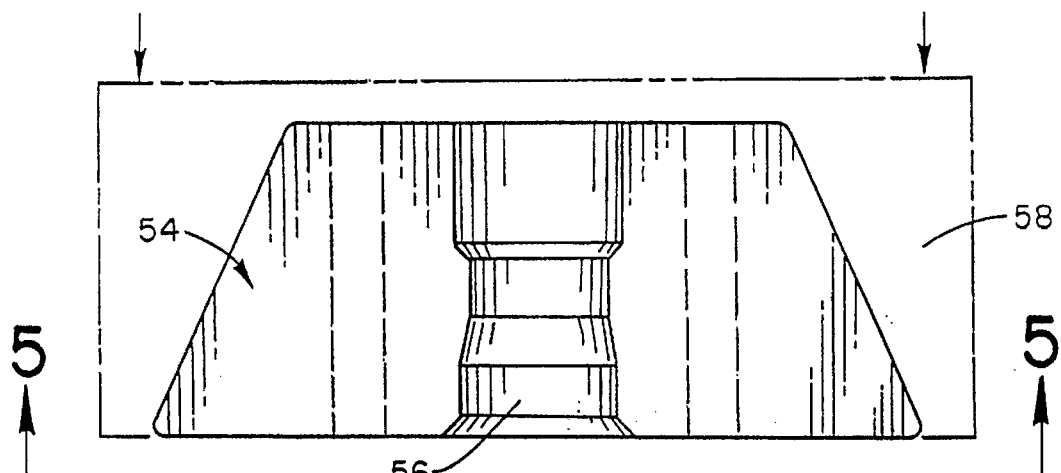
FIG. 4 is an elevational view of one of a pair of cooperating swaging dies for mechanically deforming the sleeve and interlocking the components of the flexible metal hose, a cooperating swaging cup being shown in phantom.
Figure 5:
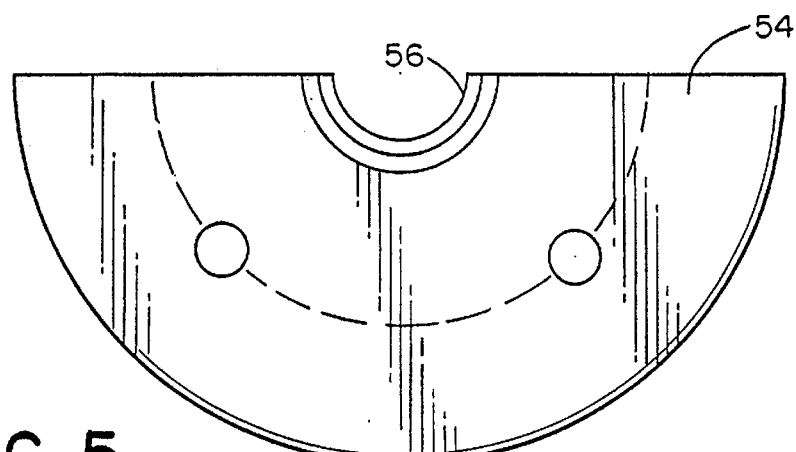
FIG. 5 is a view of the swaging die taken generally along the lines 5—5 of FIG. 4.
Figure 6:
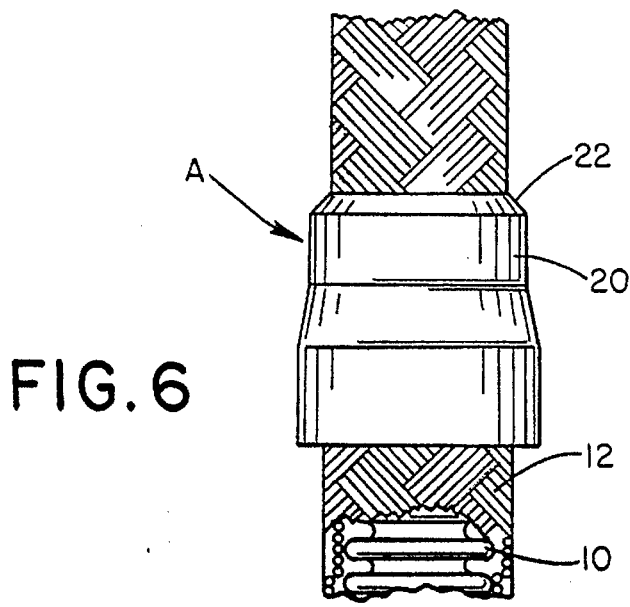
FIG. 6 is an elevational view partly in cross section of the flexible hose after the swaging operation.

While held in place by the work support or chuck jaws 24, the gauge is removed and a pair of swaging dies 54 positioned around the sleeve 20. One of the swaging dies is shown in elevation and plan views in FIGS. 4 and 5. As is well known in the art, the swaging dies are adapted to radially deform the work piece, in this particular instance the terminal end of the flexible hose. More specifically, each swaging die 54 includes a contoured cavity 56. A swaging cup 58, shown in phantom in FIG. 4, is axially advanced over the swaging dies to perform the radially inward deformation of the sleeve. This deforming step mechanically interlocks the sleeve, braid, and tube together. Particularly, the non-chamfered end of the sleeve remains substantially unaffected, while the intermediate portion and chamfered end of the sleeve are swaged to lock the components of the flexible hose together. After the swaging operation, the tube, braid, and sleeve cannot be moved axially relative to one another. The result of the swaging, or crimping, or rolling operation is illustrated in FIG. 6, in which the sleeve has been radially deformed to interlock the hose components together.

Figure 7:
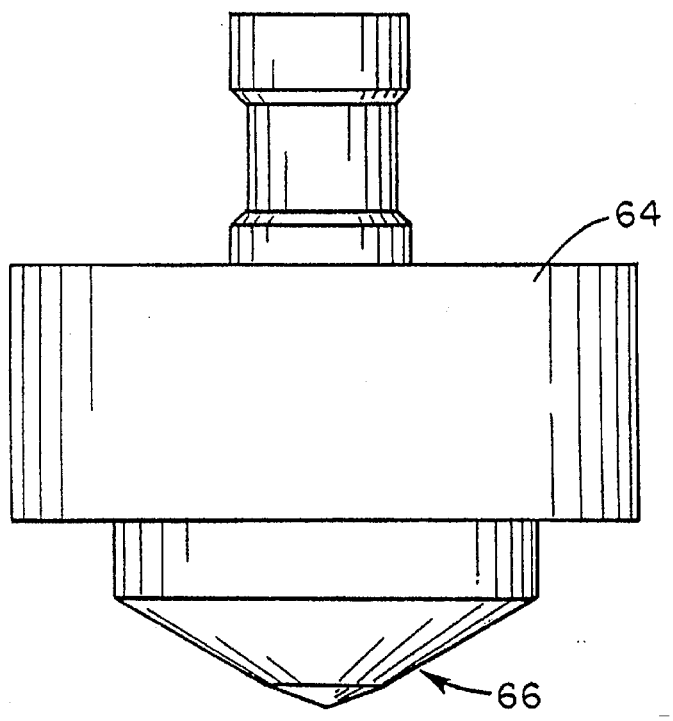
FIG. 7 is a cross-sectional view of a pre-peening tool.
Figure 8:
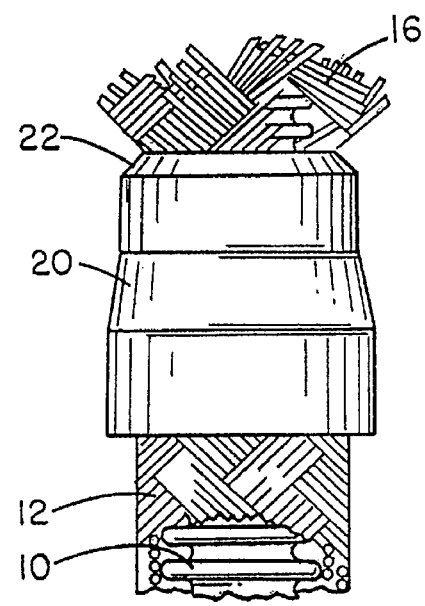
FIG. 8 is an elevational view partly in cross section of the flexible hose after the pre-peening operation.

Turning now to FIGS. 7 and 8, after the swaging dies are removed, a pre-peening tool 64 is axially advanced toward the terminal end of the flexible hose. The primary function of the pre-peening tool is to radially spread the braid end 16 outwardly by virtue of tapered surfaces 66. That is, the tapered surfaces are dimensioned for receipt in the portion of the braid that extends outward from the ends of the tube and sleeve after the locating step of FIG. 3 and the swaging step of FIGS. 4 and 5. As best illustrated in FIG. 8, the result of this pre-peening operation flares the braid end radially outward. The remainder of the flexible metal hose essentially remains unchanged.

Figure 9:
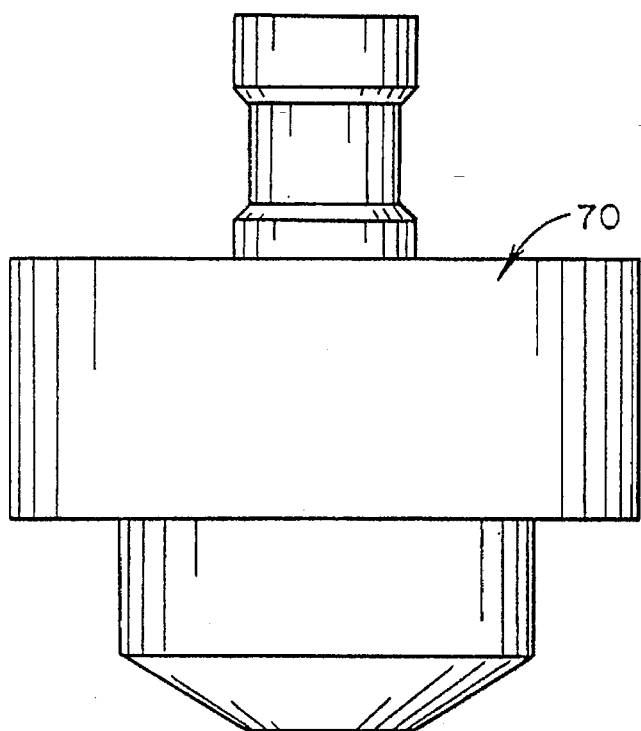
FIG. 9 is a cross-sectional view of a peening tool.
Figure 10:
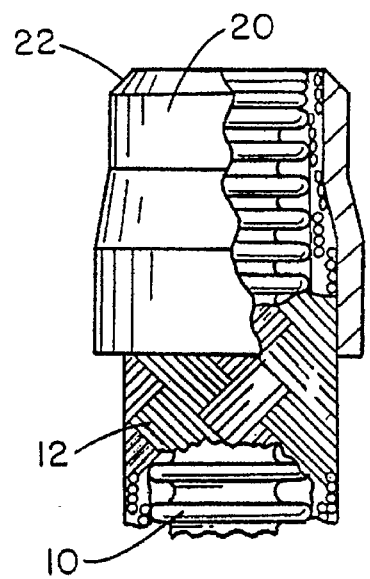
FIG. 10 is an elevational view partly in cross section of the flexible hose after the peening operation.

A peening tool 70 (FIG. 9) is next axially advanced against the end of the flexible metal hose. Particularly, its generally planar end surface 72 engages the tube end 14 and axially compresses or deforms the tube corrugate into a flush relationship with the sleeve end. In other words, the spacing between the individual corrugates of the tube is reduced at the chamfered end of the sleeve while the rest of the tube corrugations remain substantially equally spaced apart. Simultaneously, the peening tool serves the dual purpose of shearing the flared braid end from the flexible hose. The chamfered end 22 of the sleeve facilitates the shearing of the braid during this operation, serving as a cutting edge as the peening tool bottoms out against the sleeve. As shown in FIG. 10, and once the peening operation is complete, a generally planar surface is defined by the ends of the sleeve, braid, and tube.

Figure 11:
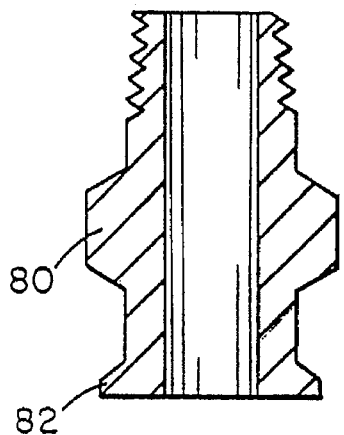
FIG. 11 is a cross-sectional view of one type of fitting adapted for securing to the flexible metal hose of FIG. 10.
Figure 12:
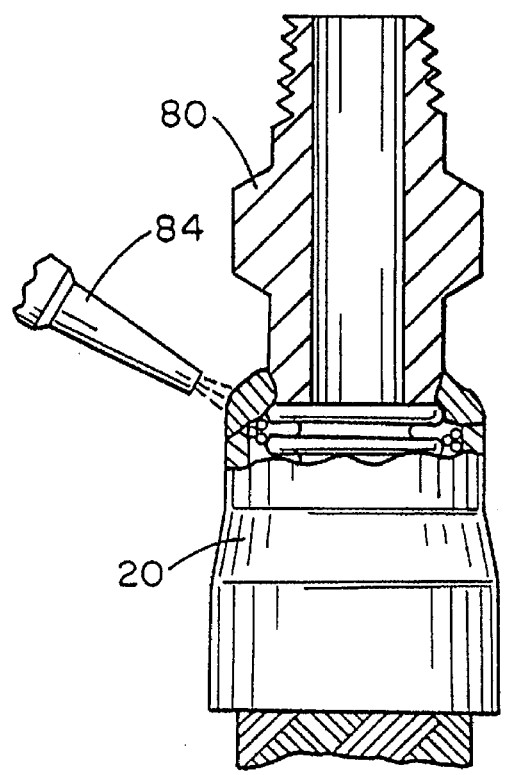
FIG. 12 illustrates the welding operation connecting the fitting to the flexible hose.
Figure 13:
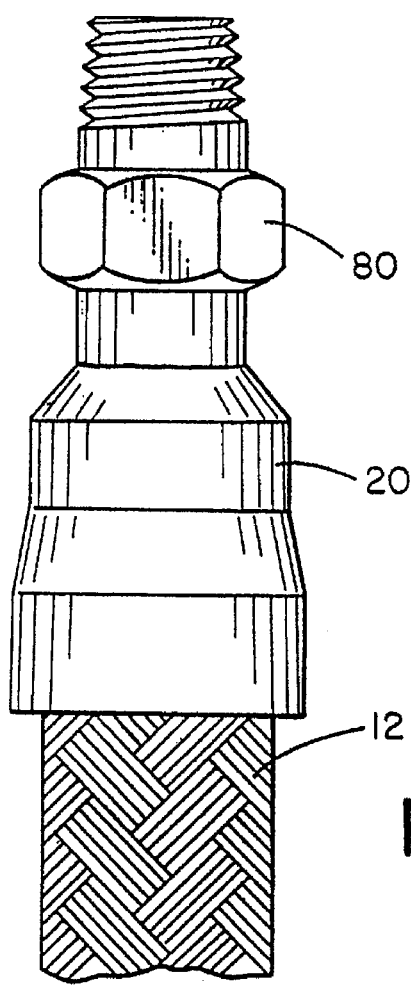
FIG. 13 is an elevational view of the assembled flexible metal hose connector.

The end of the flexible metal hose is now prepared to receive any suitable fluid fitting. As shown in FIG. 11, atypical externally threaded male connector 80 is shown. The end of the connector or fitting 80 to be secured to the flexible metal hose is modified to incorporate a foot, shoulder or radial flange 82. As shown with reference to FIG. 12, the radial flange is dimensioned to mate with the diametrical dimension of the sleeve end, so that the fitting is accurately located, i.e., concentrically, relative to the hose end. Further, the flange 82 becomes the consumable material for the arc welding process illustrated in FIG. 12 and represented by weld head 84. The chamfered end of the sleeve is substantially consumed in the welding operation (FIG. 14) so that the aesthetics of the final hose assembly are also enhanced through use of the chamfered sleeve.

The cap weld arrangement of prior art arrangements is eliminated and only the single weld is required to join the fitting to the hose. Thus, in the final product, the sleeve, braid, tube, and fitting become integrally joined in the welding operation. Although the process has been described as an autogenous weld, i.e., not requiring a filler wire or material for the fusion bonding, it will be understood by those skilled in the art that the teachings of the subject invention are equally applicable to a similar process in which a filler wire is used.

Figure 14:
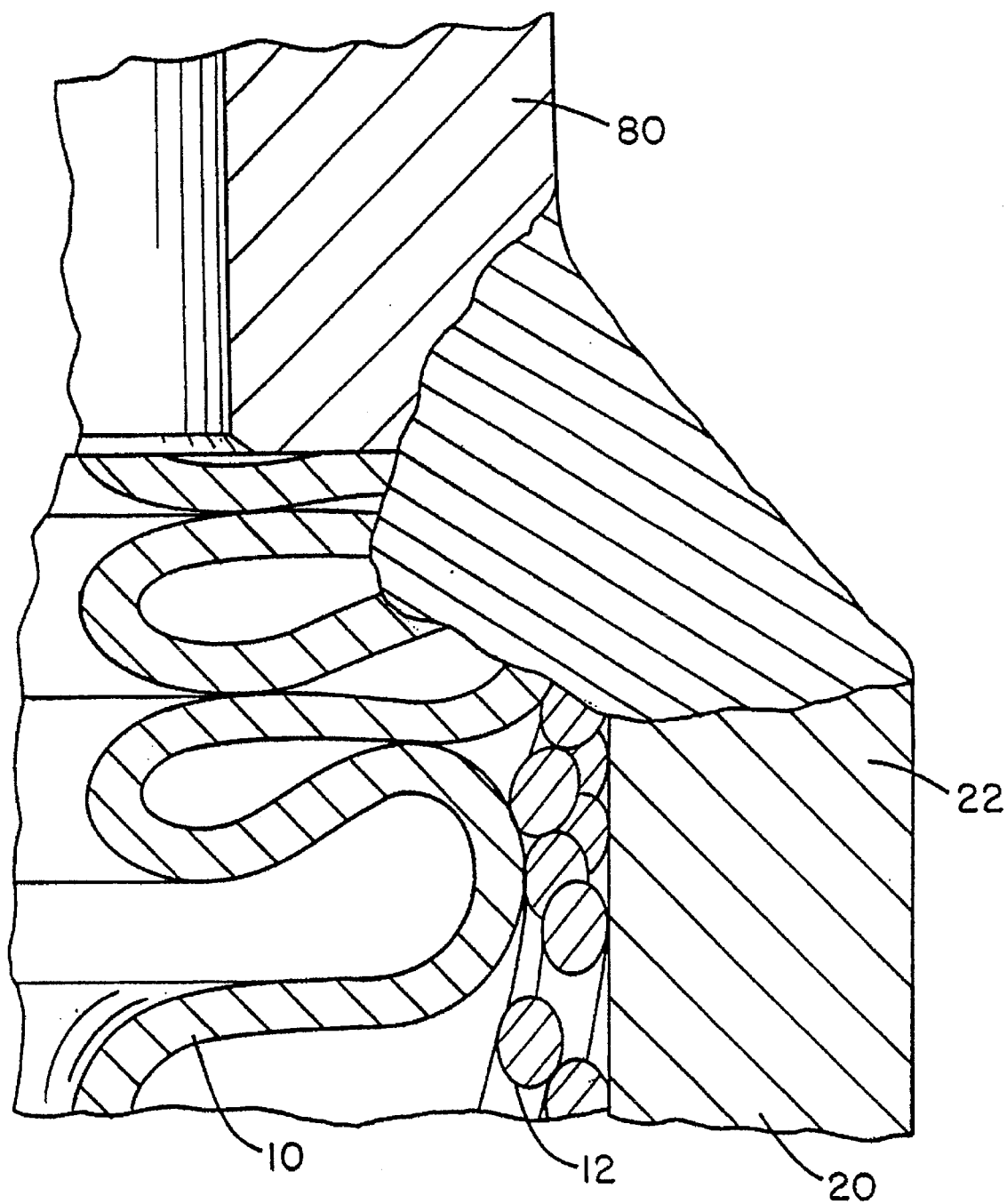
FIG. 14 is a greatly enlarged cross-sectional view of the completed flexible metal hose connector.

As particularly detailed in FIG. 14, the above-described process results in a flexible metal hose with an integral fitting in which all components of the assembly are joined together in a single weld. The described method substantially reduces the time required to join a fitting to a flexible metal hose and overcomes much of the variability encountered with prior art methods. The subject invention provides a permanent welded connection that avoids problems associated with corrosive fluids, shock from pressure surges, temperature cycling, and system vibration. Of course, still other fittings may be used as opposed to the male connector, for example a union cross, union tee, elbow, adaptor, quick connect, etc.

FIGS. 15 through 20 show a second embodiment of the invention that provides certain distinct advantages relative to the FIGS. 1 through 14 embodiment. Specifically, the FIGS. 15 through 20 embodiment reduces the number of processing steps and produces an end fitting and metal hose combination that has an improved overall appearance. In the FIGS. 15 through 20 embodiment, parts or components which correspond to those previously described with respect to the FIGS. 1 through 14 embodiment have been given the same reference numeral but differentiated therefrom with the addition of a prime (') suffix. The description of a corresponding FIGS. 1 through 14 component is to be considered as equally applicable to the corresponding FIGS. 15 through 20 component unless otherwise noted.

Figure 15:
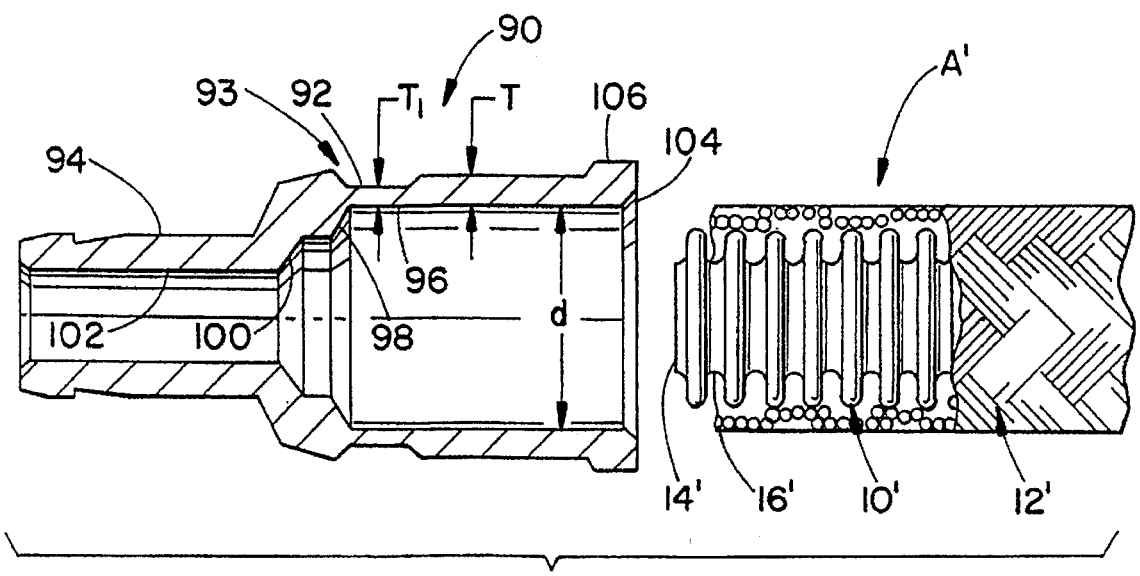
FIG. 15 is a cross-sectional view through the end of an alternative form of end fitting or connector and a hose end to which it is to be connected.

Referring particularly to FIG. 15, this second embodiment uses a one-piece, machined end fitting component 90 preferably formed from stainless steel and having a somewhat cylindrical main body section 92 and a reduced diameter cylindrical tube adapter end portion 94. This end portion could, however, be any desired type of end or fitting body. At the right-hand end of the main body 92, there is a cylindrical bore 96 which has a diameter d that is only slightly greater than the outer diameter of the braided flexible metal hose A'. The diameter d is selected so as to allow the hose A' to be closely and snugly received therein during the subsequent assembly steps. The bore 96 terminates in a radially inward extending shoulder portion 98. A transition section 100 joins the bore 96 with the reduced diameter outlet bore 102 formed centrally of the outlet end portion 94.

The inlet end to the bore 96 is preferably provided with a peripheral chamfer 104 that removes burrs and can assist in the installation of the braided flexible metal hose into position. A radially extending flange portion 106 acts to reinforce the inlet end of bore 96 and serves to provide a holding and locating means for subsequent operations. The side wall surrounding the bore 96 has a first thickness T and a reduced second thickness $T_1$ that produces a groove 93 adjacent the area of the shoulder 98. The purpose for this thinner grooved section will subsequently be described in some detail and explained with reference to the practice of the method used for joining the end fitting 90 to the flexible metal hose A'. The portion to the left of groove 93 and shoulder portion 98 (as viewed in FIGS. 15 and 16) are relatively heavy and thick.

In accordance with the subject method, the first step is to cut the braided flexible metal hose A' to its desired length. In making the cut, it is not necessary to cut through the corrugated tubing at any particular location. The hose, including the braid and the corrugated tubing, can be cut at a crest, root, or flank of a convolution of the corrugated tubing 10'. The cut should be performed, however, in such a way as to leave the end of the braid covering 12' clean and without a frayed end. This can be easily accomplished with friction cutoff blades that are in general use in industry for cutting metal tubing and the like. It is desirable, but not absolutely necessary, for the ends of the tube and braid to terminate generally in the same plane.

Figure 16:
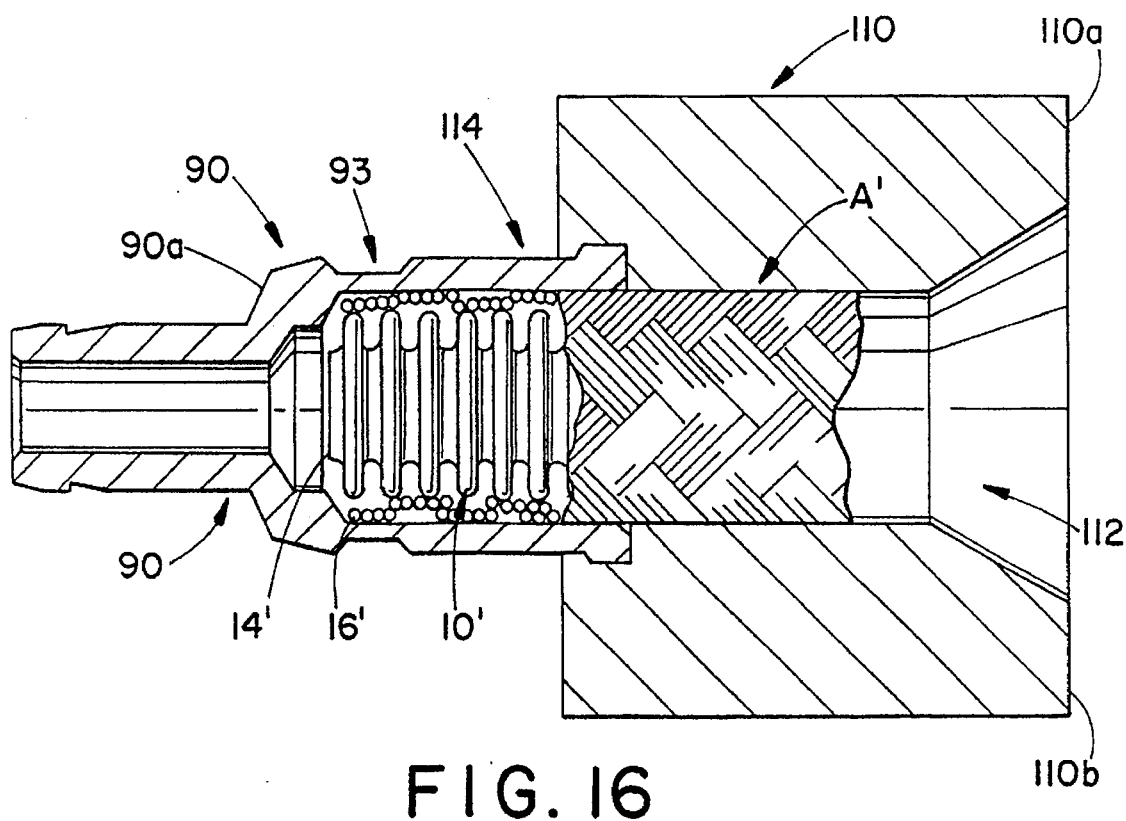
FIG. 16 is a cross-sectional view through the fitting and hose end of the FIG. 15 embodiment showing the hose end being inserted into the fitting.

After the end of the tubing A' is cut to bring the braid and inner corrugated tube 10' into general alignment, the end portion is slipped into the counterbore 96 of the end fitting to bring the end of the tube A' into engagement with the inner shoulder 98. FIG. 16 shows the tube A' in its desired located position within the end fitting 90. Preferably, a tool such as the two-part assembly ring 110 is used to facilitate the installation of the tube A' into located position within the end fitting 90. The assembly ring 110 comprises two half ring elements 110a and 110b that are shaped so as to provide a conical entrance mouth 112 leading to a circular gripping portion 114. Note that the gripping portion 114 is contoured so as to tightly engage and hold the fitting 90 in alignment with the conical guide mouth 112. The two halves 110a and 110b are, of course, suitably mounted so as to be movable in a radial gripping direction toward the fitting 90 and suitably held therein during the tubing installation process.

After the flexible metal hose A' is firmly seated in the end fitting 90, the end fitting is crimped radially inward circumferentially about the larger diameter end portion circumferentially thereabout in the area adjacent the groove at the transition between the thick and thin walled portions. The crimping or radial inward swaging is preferably carried out in the manner best understood by reference to FIGS. 17 and 18. As shown therein, a support stop element 115 is provided with a central opening 116 sized to closely receive the smaller diameter end portion 94 of the fitting 90. A suitable conically shaped mouth 118 is arranged to engage the tapered transition wall 90a of fitting 90. This functions in conjunction with assembly ring 110 and serves as a stop and additional support for the tube and fitting end during the crimping operation.

Figure 17:
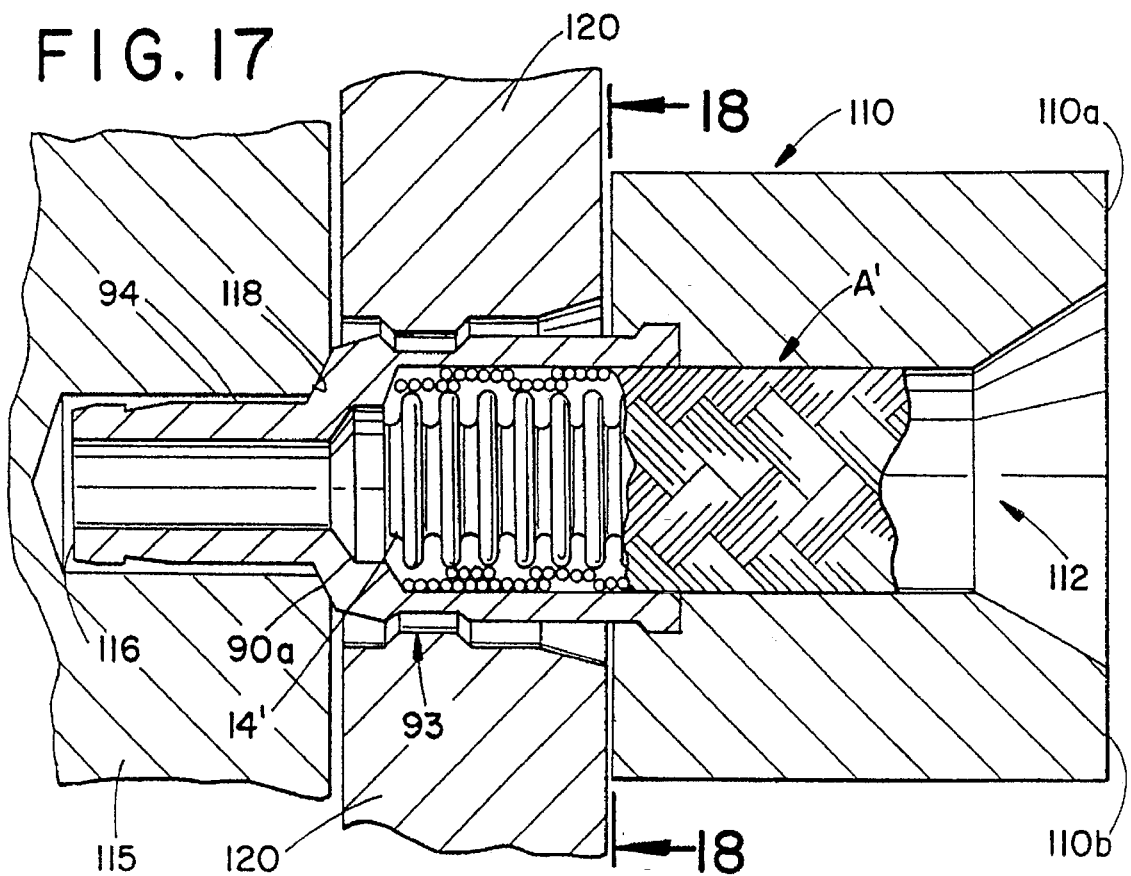
FIG. 17 is a cross-sectional view through the fitting and hose end showing the fitting body being swaged into gripping engagement with the hose end.
Figure 18:
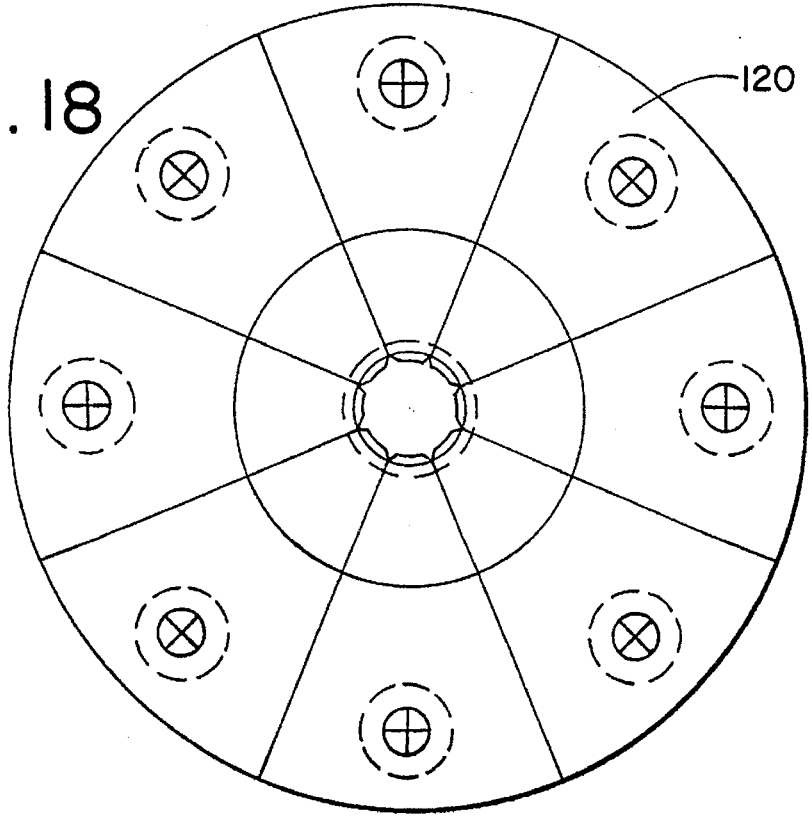
FIG. 18 is a view taken on line 18—18 of FIG. 17.
Figure 19:
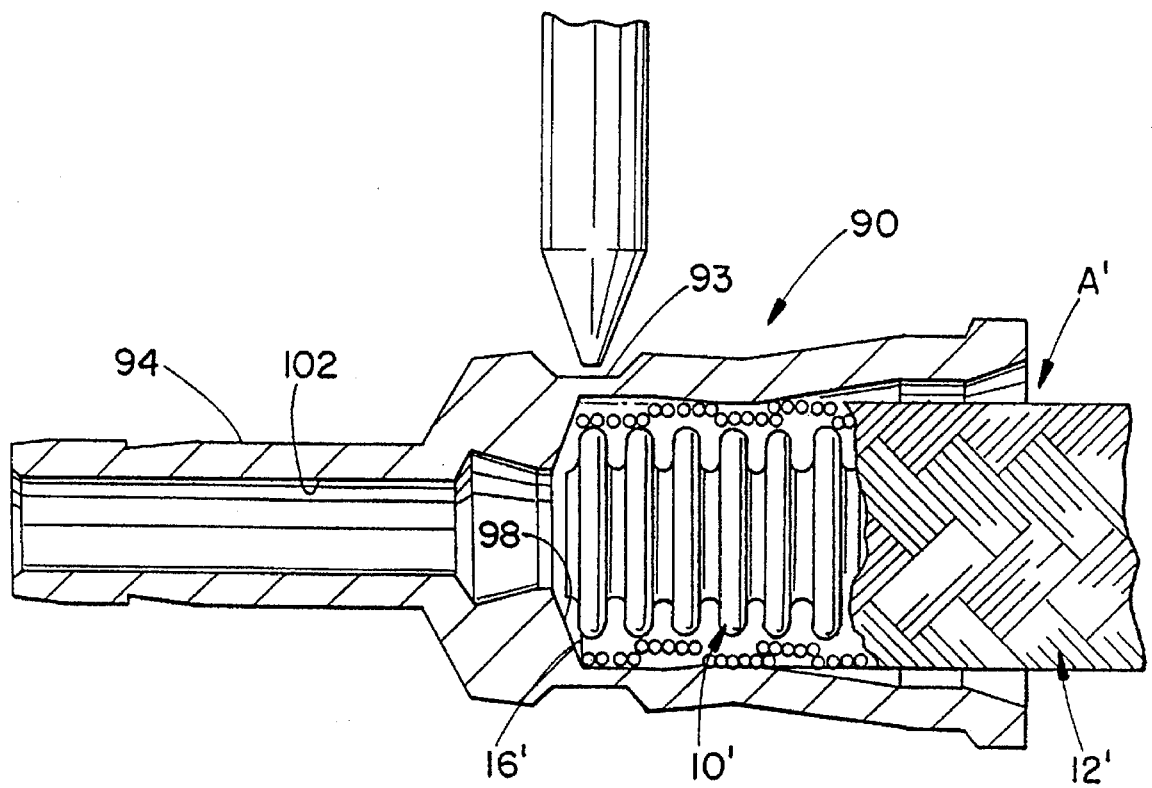
FIG. 19 is a cross-sectional view showing the fitting after the crimping operation and preparatory to the welding operation.

Preferably, the crimping or swaging is accomplished through the use of eight radially movable crimping fingers formed, for example, from tool steel and having the end face configuration best shown in FIG. 17. Preferably, there are eight of the crimp fingers positioned and shaped generally as shown in FIG. 18. They are movable radial between the radially closed position shown in FIG. 18 and a radial outward or open position which is shown in FIG. 17. Inward movement of the crimp fingers 120 is accomplished through any suitable manual or power actuated means having sufficient power to compress the circumferential wall of the large diameter end of fitting 90 to the general shape shown in FIG. 19. This causes the wall to be deformed to the shape shown and to move inwardly and firmly and tightly grip the flexible metal hose A' and assure good contact between the inner wall of the bore 96 and the flexible metal hose A'. Additionally, the braided portion 12' firmly engages the corrugated inner tube 10'.

The swaging step is carried out so that radial inward deformation of the fitting body takes place in a continuous circumferential band that includes the groove 93 and a significant axial length of the fitting body in the direction from the groove toward the entry end of the bore 96. The swaging should be sufficient to assure intimate contact between the internal surface of the fitting bore 96 and the hose to provide the proper relationship for the subsequent welding step. In addition, in areas between the weld and the entry of the bore 96, the swaging should be sufficient to produce a relatively heavy mechanical gripping between the fitting body and the hose to, in effect, isolate the weld from bending forces acting on the exposed length of the hose outwardly of the fitting. The length and location of the mechanical gripping portion of the swaging can vary but should preferably extend for an axial length that is at least as great as the width of the groove. This is shown somewhat diagrammatically in FIG. 17 wherein dimensions "a" and "b" represent the major axial lengths of the swaged portions for the groove weld area and the mechanical gripping area, respectively.

Figure 20:
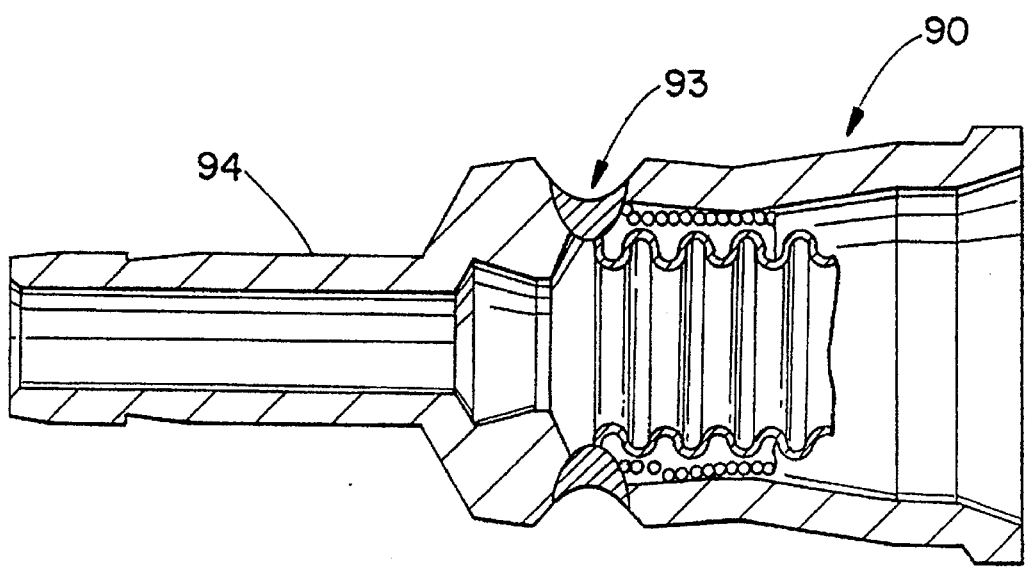
FIG. 20 is a cross-sectional view through the hose end and fitting after completion of the welding operation; and, FIG. 21 is a cross-sectional view similar to FIG. 20 but showing a modified form of end fitting useful in practicing the invention.

After completion of the swaging step, the juncture between the tube and the fitting is deep penetration welded totally circumferentially about the end at the location shown above the thin walled and grooved portion 93 of the sleeve adjacent the end wall 98. If the weld is properly made to the desired penetration, the penetration joins the tube, the braid, and the end fitting together in a leak-tight manner. The deep penetration makes the weld more independent of the phase or pitch of the convoluted hose. The resulting welded fitting is as shown in FIG. 20.

The geometry of the fitting 90 is important to the invention and produces an improved function and appearance of the resulting product. In particular, the thin wall area at the bottom of groove 93 allows easier deep penetration of the weld. The thicker walls on both sides of the groove act as heat sinks. These confine the weld puddle edge in a way that keeps the puddle under control and prevents undesired dripping and movement of the molten material. This results in improvement of the weld in terms of strength and uniformity, as well as in terms of appearance. Note that, as shown in FIG. 20, the welded area generally assumes a smoothly contoured groove configuration.

In addition to the above, it should be noted that the relationship between the end wall or shoulder 98 and the groove 93 assures that the ends of the tube and braid of the flexible metal hose A are located inwardly beyond the point where the weld is applied. This prevents the braid from being omitted from the weld. The consistent braid inclusion is an improvement relative to prior techniques.

Figure 21:
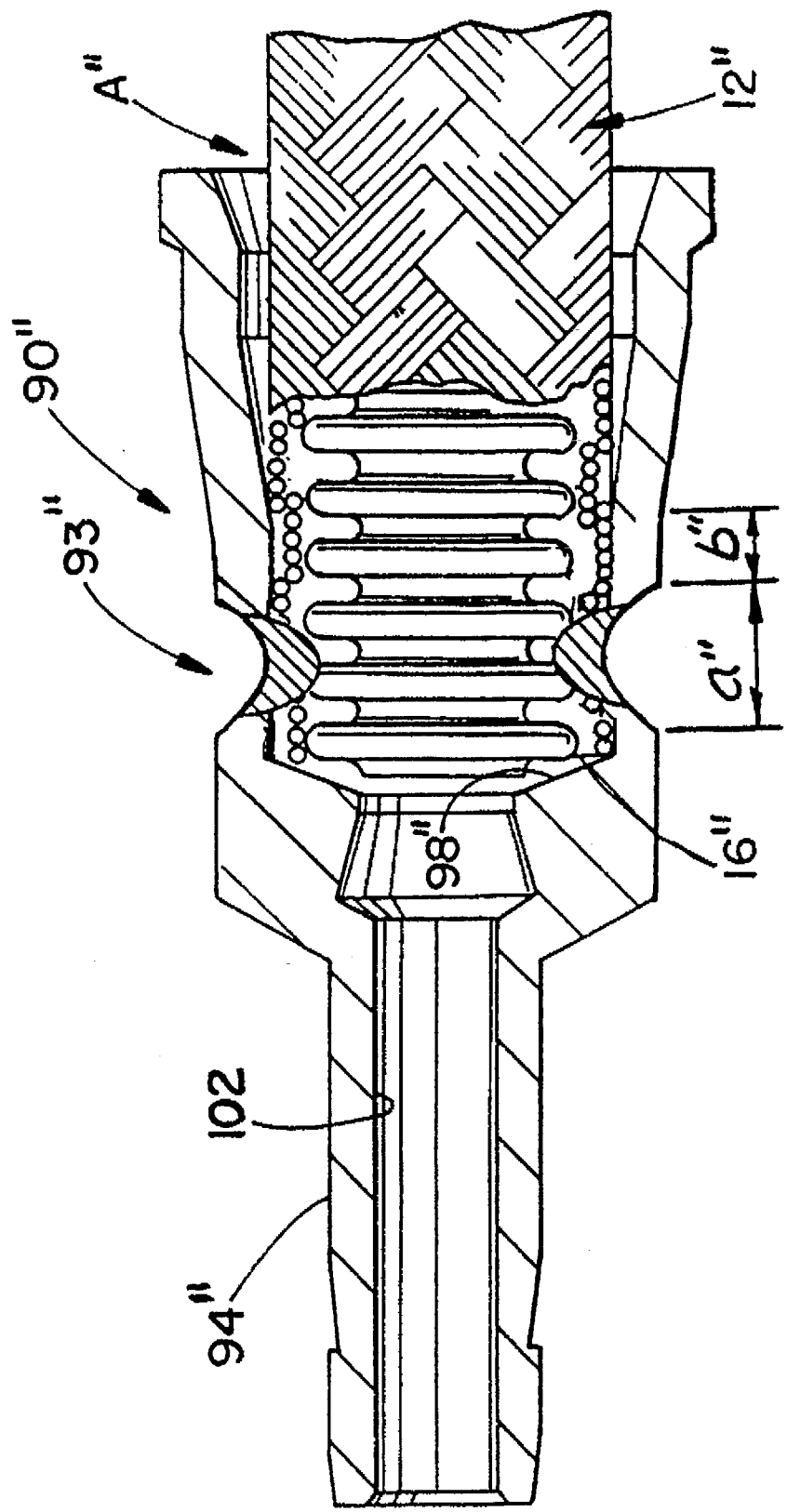

FIG. 21 illustrates a further embodiment of the invention which is basically the same as the embodiment of FIGS. 15–20. Accordingly, the same reference numerals differentiated by a double prime (") suffix have been used to identify corresponding parts. In this embodiment, however, the groove 93" in which the circumferential weld is located is spaced from the shoulder 98" in a direction axially toward the entrance end of bore 96". The swaging step is carried out to shift in a direction toward the entrance end an amount equal to the spacing between the groove 93" and shoulder 98" as shown by dimensions a" and b".

By moving the groove and the swaging in the manner described and shown, the preparation of the end of the tube and braid is not as critical as with the earlier embodiments.

The invention has been described with reference to preferred embodiments. Obviously, modifications and alterations will occur to others upon a reading and understanding of this specification. For example, different materials of construction may be used, or different fittings may be secured to the flexible hose. The illustrated and described embodiment is not intended to be limiting. Rather, the subject invention is intended to include all such modifications and alterations insofar as they come within the scope of the appended claims or the equivalents thereof.

Having thus described the invention, it is now claimed:

1. A flexible metal hose and end fitting assembly comprising:

a hose including a hollow tube having a longitudinal axis defined by corrugations substantially equally spaced apart in an axial direction with a braid received over the tube, the braid and the tube terminating at an end plane perpendicular to the longitudinal axis of the tube and defining the end of the hose;

a metal end fitting comprising a cylindrical first body section having a cylindrical bore extending axially there into and closely receiving the end of the hose, the bore terminating in a radially inwardly extending shoulder lying in a plane perpendicular to the axis of the bore with the end of the hose engaging the shoulder;

a deep penetration weld extending circumferentiallly about the first body section adjacent the shoulder and welding the fitting to the end of the hose;

the first body portion of the fitting on the side of the weld axially opposite the shoulder being deformed radially inward to mechanically grip the hose; and, the first body portion of the fitting in the area adjacent to the shoulder having a reduced thickness as compared to the thickness of the radially deformed section.

2. A flexible metal hose assembly comprising:

a metal hose including a hollow metal tube defined by corrugations substantially equally spaced apart in an axial direction with a metal braid received over the tube and extending axially coextensive therewith;

a rigid fitting sleeve having first and second ends and a cylindrical bore extending axially inward from a first end and terminating in an axial inner shoulder, an end of the hose extending into the bore, the bore having the axial inner shoulder generally aligned with an end of the hose and a narrow continuous circumferential weld about the fitting sleeve between the shoulder and the first end to sealingly join the fitting sleeve to the hose; and, the fitting sleeve being swaged radially inwardly in a circumferential band that extends axially from the weld toward the first end to mechanically grip the hose in the fitting sleeve to substantially reduce the transmission of bending forces from the hose to the weld.

3. The flexible metal hose assembly as set forth in claim 2 wherein the fitting sleeve has a radially inward extending groove with the said weld located in the bottom of the groove.

4. The flexible metal hose assembly as set forth in claim 3 wherein the said circumferential band has an axial length that is at least as great as the width of the groove.

5. The flexible metal hose assembly as set forth in claim 3 wherein the groove is spaced from the shoulder in a direction axially toward the first end of the fitting.

* * * * *